(12) United States Patent
Boswell, Jr. et al.

(10) Patent No.: US 6,272,169 B1
(45) Date of Patent: Aug. 7, 2001

(54) SOFTWARE BASED MODEMS THAT INTERACT WITH THE COMPUTING ENVIROMENT

(75) Inventors: Charles Ray Boswell, Jr.; Terry Lynn Cole; David Mason Kaplowitz, all of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/094,096

(22) Filed: Jun. 9, 1998

(51) Int. Cl.[7] ................................ H04B 1/38; H04L 5/16
(52) U.S. Cl. ................................. 375/222; 375/225
(58) Field of Search ..................... 375/222, 223

(56) References Cited

U.S. PATENT DOCUMENTS 4,965,641   10/1990   Blackwell et al. ............... 375/7
5,910,970 *  6/1999   Lu ................................... 375/377

OTHER PUBLICATIONS

Glaskowsky, "Soft Take Cheap Shot at DSPs: "Host Signal Processing" May Supplant DSPs in PCs and Consumer Devices," Microprocessor Report, Dec. 9, 1996, pp. 10–11.

Blalock, "Microprocessors Outperform DSPs 2:1: Unpredictable Execution, Poor Tools Complicate Use in Real–Time Applications," Microprocessor Report, Dec. 30, 1996, pp. 12–15.

* cited by examiner

Primary Examiner—Chi Pham
Assistant Examiner—Phuong Phu
(74) Attorney, Agent, or Firm—Conley, Rose & Tayon, PC; B. Noël Kivlin

(57) ABSTRACT

A modem to select a data transfer protocol based at least in part on conditions of the computing environment in which the modem is implemented. The modem includes means for monitoring the system processing load and selecting modem technologies and bit rates which are appropriate for current and anticipated system loading. The modem can determine system loading from measurements of microprocessor utilization in various execution contexts and can select a technology and bit rate which meets modem data transfer requirements while minimizing utilization during peak system loading.

5 Claims, 3 Drawing Sheets

SOFTWARE BASED MODEMS THAT INTERACT WITH THE COMPUTING ENVIROMENT

BACKGROUND OF THE INVENTION

1. Field of the Invention

The invention relates generally to modems and more particularly to software modems that are implemented in microprocessors and that use information about the computing environment to determine the most appropriate data transfer rate.

2. Description of the Relevant Art

As the performance of microprocessors has increased, so have the opportunities to develop software applications. The software applications that have been developed to take advantage of these opportunities have included not only what might be considered more traditional applications, but also applications which emulate or take over functions traditionally implemented in hardware. By taking advantage of the extra processing power, software implementations can reduce the cost of the modem components in computing systems.

A modem is one example of computer system component which can be implemented in software. Software modems may provide various advantages over hardware modems. Software designs may be more easily changed than hardware designs. Likewise, it may be easier to update the software designs and to provide the updates to users. Modem applications may, however, present complications which do not arise from other types of applications. For instance, modem applications must operate in real-time and must operate under particular latency constraints with respect to the analog converter which is used to interface with the telephone line. Further, modem applications generally require a large portion of the processing time available in the system. Therefore, in a heavily loaded system, modem applications may worsen the loading situation by increasing the number of applications and devices competing for scarce system resources.

When a connection is established between a pair of modems, the modems must agree upon a protocol which will be used as the basis for transmitting and interpreting data between them. The modems first negotiate with each other to choose a modem technology within which to operate. This technology is normally the most recent technology which is common to both modems. A given technology generally allows operation within a discrete range of bit rates. Prior art software modems select one of these bit rates based only upon the quality of the telephone line on which the modem connection is established. The higher rates are used when the conditions on the telephone line are good and less fault tolerance is required and the lower rates are used when line conditions are poor and the modem connection needs to be more fault tolerant. Once the technology and bit rate are established, the modems can begin transmitting data.

SUMMARY OF THE INVENTION

The present invention provides a means and method for a modem to select a data transfer protocol based at least in part on conditions of the computing environment. The invention can therefore adapt its operation to more heavily loaded systems while avoiding failure of the connection and unwanted artifacts or behavior which may result from the heavy loading. Certain graphic-intensive applications, for example, may exhibit jerky behavior rather than smooth, continuous motions.

The invention includes means for a modem to monitor the system processing load (referring generally to information on the computing environment such as microprocessor loading and latency characteristics.) Using this information, the modem can select technologies and bit rates which are appropriate for current and anticipated system loading. The modem can determine system loading from measurements of microprocessor utilization in interrupt context, latency of the background scheduler mechanism or microprocessor utilization in process level context. If the system processing load is high, the modem can select a technology which requires less system resources than the most recent common technology, or it can select a bit rate which places less demands on the system than the highest bit rate allowable given a particular technology and certain line characteristics.

BRIEF DESCRIPTION OF THE DRAWINGS

Other objects and advantages of the invention will become apparent upon reading the following detailed description and upon reference to the accompanying drawings in which.

Figure 2:
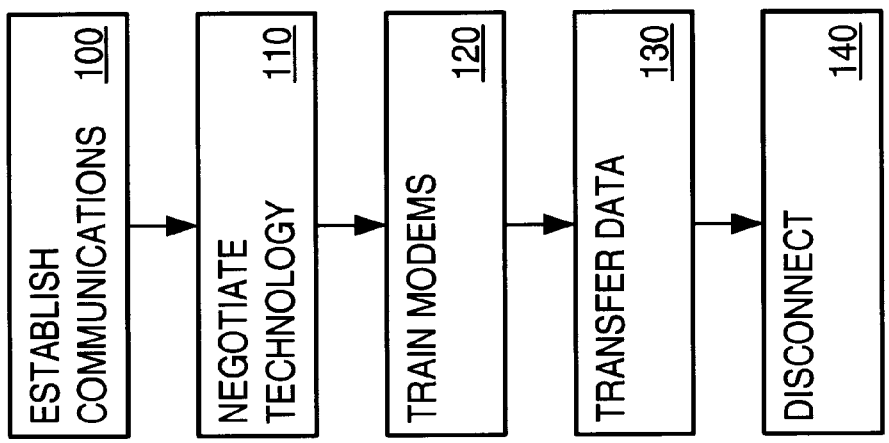
FIG. 2 is a flow diagram illustrating the stages of operation of one embodiment of the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the invention which will be described below is a software-implemented (or host-based) modem configured to enable training based on both line characteristics and system processing load. (It should be noted that, although the embodiment described below is implemented in a host processor, alternate embodiments may be implemented in hardware or associated non-host processors.) The modem may also be dynamically reconfigured based on this information. The use of system processing load information allows the modem to select a bit rate which best fits the current and anticipated system loading and fulfills the modem operational requirements. The modem measures microprocessor utilization and selects a technology and/or bit rate which may be adjusted (toward simpler technologies or lower bit rates) to reduce the demands of the modem on the computer system. The microprocessor utilization may be measured directly in interrupt context, it may be determined from background scheduler mechanism latency, or it can be measured indirectly in process level context. The system processing load can then be calculated from this information.

Figure 1:
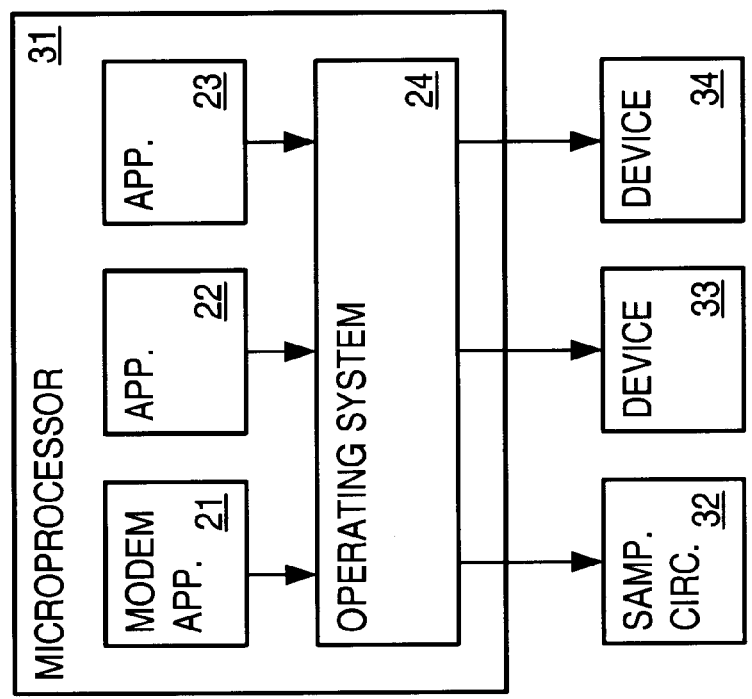
FIG. 1 is an illustration of a computing system in which a software modem is executing.

The increasing speed of microprocessors and the increasing bandwidth of memory systems has resulted in software implementations of modem algorithms becoming an attractive replacement for hardware modems. FIG. 1 illustrates a computing system in which a software modem is executing. Modem algorithm 21 must share processing time with other applications 22, 23. These applications may execute at the process level so that their execution does not interfere with the function of the modem, or they may execute at the interrupt level so that they compete with the modem algorithm for processing time. The applications 21–23 execute under operating system 24. The operating system itself executes on microprocessor 31. Microprocessor 31 uses sampling circuitry 32 as an interface between the modem algorithm and the data line 41. Microprocessor 31 may have several peripheral devices 33, 34 in addition to the sampling circuitry 32. These peripheral devices may send interrupt requests which must be serviced by microprocessor 31 and which therefore compete with the modem algorithm for processing time. Although FIG. 1 shows a sampling circuit which uses an ordinary analog telephone line as a data line, it should be noted that alternate embodiments of the invention may be designed for use with data lines utilizing digital line technologies such as ISDN or xDSL and corresponding interfaces to the microprocessor.

Because the software modem uses a sampled data algorithm, it must be run with a high degree of determinism. That is, the system must perform in a manner which can be predicted very precisely because it must be able to provide real-time delivery of data for use in the algorithm. Since a user may add new devices, drivers or applications to the computing environment, however, the system may be unable to support real-time operation. This situation may result from the demands of servicing the devices or from dynamic loading due to execution of other applications and may cause unwanted behavior or disconnection of the modem. Software modems must be able to provide real-time functionality despite these varying load conditions. The software modem designer must therefore be able to determine the computing environment conditions in order to ensure that the modem will operate in real time.

Referring to FIG. 2, a flow diagram illustrating the stages of operation of one embodiment is shown. When a connection is established between a pair of modems 100, the modems must agree upon a protocol which will be used as the basis for transmitting and interpreting data between them. The process of reaching agreement on the protocol is sometimes referred to as inter-working, or handshaking. The modems first negotiate with each other 110 to choose a modem technology within which to operate. After the technology is selected, the modems select a bit rate at which data will be transferred between them 120. Once the modem technology and bit rate have been established, the transfer protocol is defined and the modems can begin to transfer data 130. After the data transfer is complete and the modem connection is no longer needed, the modems are disconnected 140.

Figure 3:
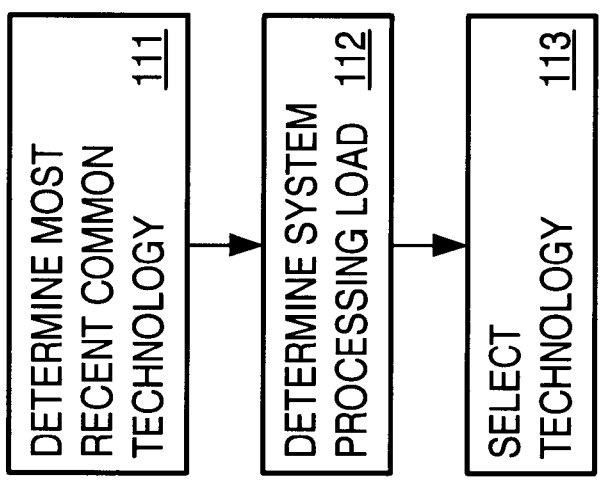
FIG. 3 is a flow diagram illustrating the stages of the negotiation process of one embodiment of the invention.

Most modems implement several technologies, ranging from more modem, complex technologies to older and simpler ones. This allows a given modem to be compatible with other modems which use both old and new technologies. The selection of the modem technology to be used in communications between a pair of modems is referred to herein as negotiation. Referring to FIG. 3, the stages of the negotiation process are illustrated. The modems will determine one or more common technologies 111, determine the system processing load 112 and then select a technology which is common to both modems and appropriate to the computing environment 113, as indicated by the system processing load. It is not necessary that the common technologies be determined before the system processing load. In some embodiments, the system processing load may be determined first so that the modems do not waste time checking for common technologies which place too much additional loading on the system and which would therefore not be selected by the modems. In other embodiments, the modems may take into account aspects of the computing environment other than the system processing load.

When the modems enter the negotiation stage, one modem typically identifies the technology of the other. If one modem uses a newer technology, this modem will detect the older technology of the other modem and "fall back," or use the older technology. In this manner, the modems will normally select the most recent technology which is common to both modems. The modems may use the most recent common technology if it is appropriate to the computing environment (e.g., if the system is not heavily loaded.) If the system is heavily loaded, the modems may fall back to a technology which is common to both, but which is not the most recent of the common technologies. The selection of an older, simpler technology may place fewer demands on the system and may result in less likelihood of dropping the telephone connection or violating operational constraints (e.g., real-time data delivery.)

The modem technology defines most of the parameters of the communication protocol, but does not define a particular speed, or bit rate, at which data will be transmitted. The technology instead specifies a range of bit rates at which data may be communicated. Typically, more recently developed technologies have higher allowable bit rates than older technologies. Table 1 shows the maximum bit rates for various modem technology standards defined by the CCCIT/ITU (Consultative Committee on International Telephone and Telegraphy, now known as the International Telecommunications Union, Telecommunication Standardization Sector.) After the modems have agreed upon a technology, one of the bit rates which is available for that technology is selected. The selection of the appropriate bit rate is referred to herein as training.

TABLE 1

| MODEM TECHNOLOGY | MAXIMUM BIT RATE |
| --- | --- |
| V.21 | 300 bits per second |
| V.22 | 1200 bits per second |
| V.22bis | 2400 bits per second |
| V.32 | 9600 bits second |
| V.32bis | 14,400 bits per second |
| V.32terbo | 19,200 bits per second |
| V.34 | 28,800 bits per second |
| V.34bis | 33,600 bits per second |
| V.90 | 56,000 bits per second |

Figure 4:
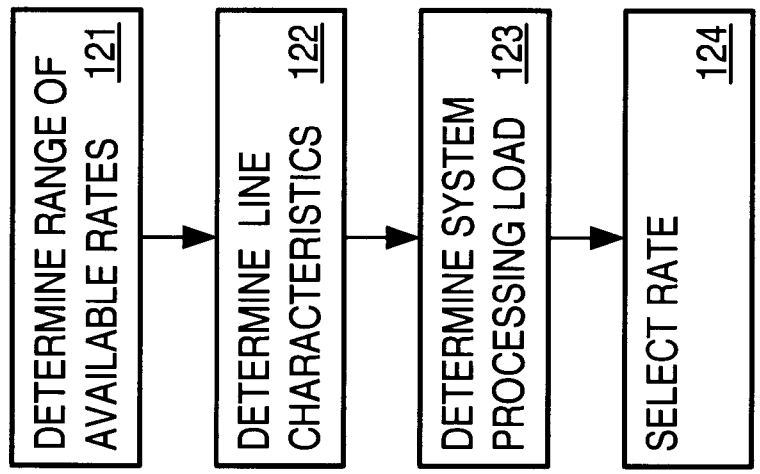
FIG. 4 is a flow diagram illustrating the stages of the training process of one embodiment of the invention.

Referring to FIG. 4, the stages of the training process are illustrated. As noted above, the modems must determine the range of bit rates which are available within the selected technology 121. The characteristics of the telephone line used for the connection are then determined 122. Then, as in the negotiation process, the system processing load or other characteristics of the computing environment are determined 123. Finally, the bit rate is selected based upon the foregoing information 124. Even though a high bit rate may be available within a technology, the line characteristics may require selection of a lower rate. For example, if more noise is present on the line, a slower bit rate will be chosen than if there was an insignificant amount of noise. This is the only factor used in the prior art to determine which bit rate will be selected. In this embodiment, the modems also take into account characteristics of the computing environment, such as system loading. The modems are thus able to select a bit rate which does not place excessive demands on the system (i.e. demands which could cause unwanted behavior or a dropped connection.)

Figure 5:
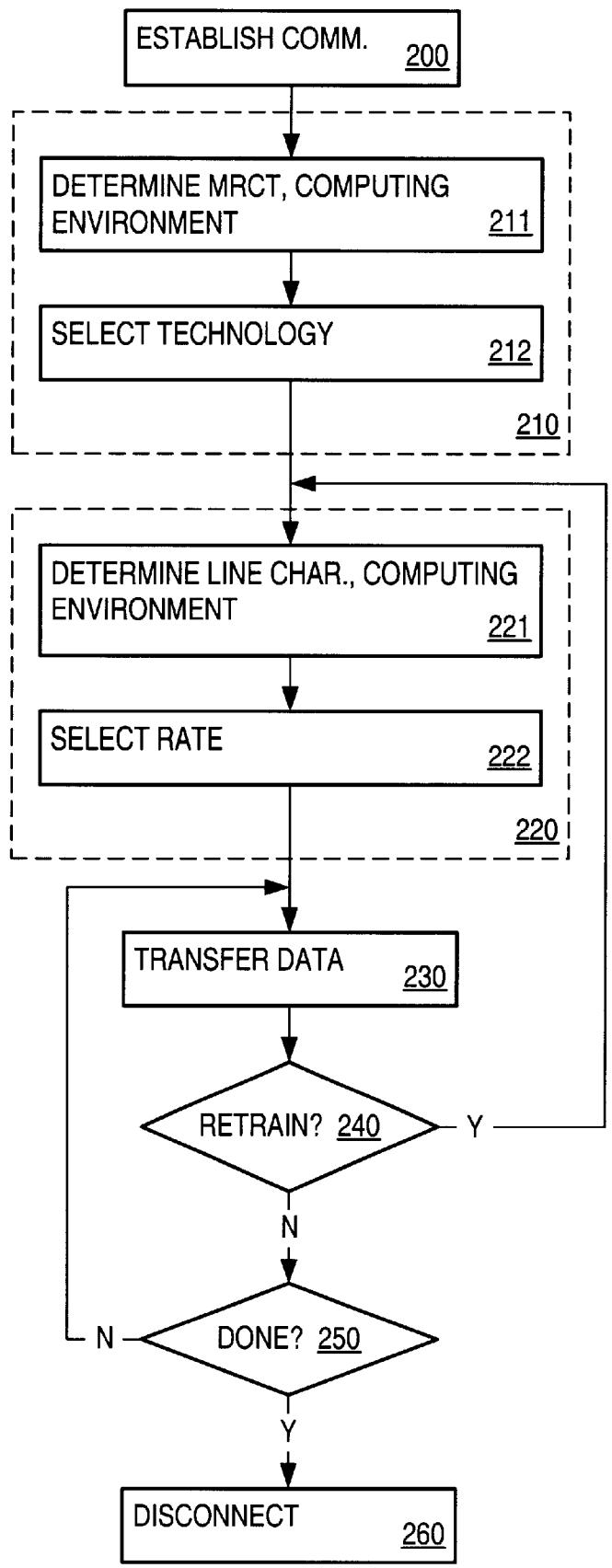
FIG. 5 is a flow diagram illustrating a modem algorithm in one embodiment of the invention in which the modems can be retrained.

Referring to FIG. 5, a diagram illustrating a modem algorithm in which the modems can be retrained is shown. After a connection is established between the modems 200, the modems proceed to negotiate the modem technology 210 and train to select a bit rate 220 as described above. In this embodiment, the characteristics of the computing environment are determined 211 for negotiation step 210 and again 221 during the bit rate selection 220. These characteristics are taken into account when the technology is chosen 212 and when the bit rate is selected 222.

The modems then proceed to transfer data 230 according to the selected technology and bit rate. Periodically, one or both of the modems check 240 conditions on the telephone line and in the computing environment to determine whether there has been a change which indicates that the modems should be retrained. If there has been such a change in conditions, the modem which detected the change sends a request to the other modem to retrain. If the request is accepted, the modems re-enter training 220. FIG. 5 shows that the new bit rate is selected without re-determining the line and environment conditions because these conditions were determined just prior to retraining. In other embodiments, retraining may include another check of these conditions. If, when the computing environment and line conditions do not indicate that retraining is necessary, the algorithm checks to see if the data transfer is complete 250. If the transfer is not complete, it continues 230. If the transfer is complete, the connection is dropped 260. The algorithm may alternately enter a standby mode in which continues to monitor environment and line conditions or reverts automatically to a lower bit rate.

Information on the computing environment can be acquired autonomously or through the operating system. The system processing load can be determined through measurement of interrupt utilization of the microprocessor, latency of the background scheduler or process level utilization of the microprocessor.

In the interrupt context, all processes other than the interrupt subroutine are suspended. Only the interrupt subroutine is executed in this context. Because the modem algorithm is a sampled-data algorithm, the interrupts from the sampling circuitry are generated at regular intervals. The modem can determine the interrupt rate, or it may have a priori knowledge of the interrupt rate. The modem algorithm can also measure the amount of time which is spent in the interrupt context (and the average per interrupt,) either by using external elapsed timers or by using assets of the host microprocessor. From the interrupt rate and average time spent in the interrupt context, the modem algorithm can calculate the microprocessor utilization.

In the deferred processing context (DPC context,) the utilization of the microprocessor can be determined indirectly. The DPC context has a priority which is lower than the interrupt context, but higher than the background context (or passive context.) Routines which are executed in the DPC context are scheduled by the operating system dispatcher or background scheduler mechanism. The DPC context is therefore also known as dispatch context. Routines in the DPC context are scheduled to be executed as soon as possible after pending interrupt routines and are subject to suspension when other interrupt-context routines request service. The modem algorithm can measure the latency of the background scheduler in DPC context using elapsed timers or host microprocessor assets. Although this measurement does not provide an exact measurement of microprocessor utilization, it does provide an indication of how heavily the microprocessor is loaded and can indicate changes in the loading. Higher latencies indicate that the system is more heavily loaded, while shorter latencies indicate lighter loading.

The microprocessor loading can further be measured in the process level or passive context. The process level context has the lowest priority and can be suspended for either DPC-context or interrupt-context routines. The microprocessor is considered to be executing in process level context whenever it is not executing in DPC or interrupt contexts. By measuring the percentage of the microprocessor's time which is spent executing in the process level context, the percentage of time available for DPC and interrupt context processing can be determined.

By measuring the percentage of time which is spent in each of the processing contexts, the modem algorithm can accurately determine the system loading. In the presence of a given level of loading, the selection of certain bit rates for the modem algorithm may provide better or more reliable service. For example, although a bit rate of 28,800 bits per second may be available in the selected technology and supportable given the characteristics of the telephone line used for the modem connection, the system may be so heavily loaded that it may not be able to timely service the interrupts for the sampling circuitry. If the interrupts cannot be serviced, the connection may be dropped. Thus, while a 28,800 bit-per-second rate may actually provide faster data transfer, a rate of 14,400 bits per second may be the highest rate at which the system can reliably maintain a connection.

In one embodiment, the computing environment characteristics are determined whenever this information is required by the modem algorithm (e.g., when the algorithm enters the negotiation or training processes.) In other embodiments, the algorithm may periodically determine these characteristics so that the information is readily available when needed by the algorithm. For example, if the modem algorithm provides for re-training or re-negotiation based upon changes in the computing environment, the system processing load may have to be checked from time to time. The modem algorithm may also maintain histograms of system processing load in order to enable the algorithm to anticipate system loading.

It is contemplated that various embodiments of the invention may involve determination of system loading or other characteristics of the computing environment either solely in the training process or solely in the negotiation process. While many modem technologies allow the modems to re-enter the training process (or re-train) when warranted by changing line conditions, it is impossible to re-enter the negotiation of the modem technology. The use of computing environment information in the training process may therefore be considered by some to be especially useful. It is contemplated by the inventors that new modem technologies may allow re-negotiation of the technology (while maintaining the connection) to occur. It is therefore believed that the use of computing environment information can be equally useful in the negotiation process.

While the present invention has been described with reference to particular embodiments, it will be understood that the embodiments described above are illustrative and that the scope of the invention is not limited to these embodiments. Many variations, modifications, additions and improvements to the described embodiments are possible. These variations, modifications, additions and improvements are intended to be within the scope of the invention as detailed within the following claims.

What is claimed is:

1. A system, comprising:
    a processor configured to execute instructions;
    modem software accessible by the processor and comprising instructions executable by the processor;
    an interface coupled to said processor and configured to transmit and receive signals over a data line in response to commands generated by the processor when the processor is executing the instructions of the modem software;
    wherein the modem software is configured to:
        determine a first measure of a utilization of the processor before a beginning of a data transfer operation via the interface;
        negotiate a data transfer bit rate for the data transfer operation dependent upon the first measure of the utilization of the processor before the beginning of the data transfer operation;
        determine a second measure of the utilization of the processor during the data transfer operation; and
        negotiate a change in the data transfer bit rate for the data transfer operation during the data transfer operation dependent upon a difference between the first and second measures of the utilization of the processor.

2. The system of claim 1 wherein said processor is a processor of a host computer system.

3. The system of claim 1 wherein said modem software is further configured to negotiate a modem technology for the data transfer operation based upon the first measure of the utilization of the processor before the beginning of the data transfer operation.

4. The system of claim 1 wherein said modem software is configured to negotiate an increase in the data transfer bit rate for the data transfer operation during the data transfer operation if the first measure of the utilization of the processor is greater than the second measure of the utilization of the processor, and to negotiate a decrease in the data transfer bit rate if the first measure of the utilization of the processor is less than the second measure of the utilization of the processor.

5. The system of claim 1 wherein said modem software is further configured to:
    negotiate a modem technology for the data transfer operation based upon the first measure of the utilization of the processor before the beginning of the data transfer operation; and
    negotiate a change in the modem technology for the data transfer operation during the data transfer operation dependent upon a difference between the first and second measures of the utilization of the processor.

* * * * *